United States Patent
Cheung et al.

(10) Patent No.: US 7,158,684 B2
(45) Date of Patent: Jan. 2, 2007

(54) ENTROPY CODING SCHEME FOR VIDEO CODING

(75) Inventors: Ngai-Man Cheung, Los Angeles, CA (US); Yuji Itoh, Ibaraki (JP)

(73) Assignee: Texas Instruments Incoporated, Dallas, TX (US)

( * ) Notice: Subject to any disclaimer, the term of this patent is extended or adjusted under 35 U.S.C. 154(b) by 738 days.

(21) Appl. No.: 10/364,104

(22) Filed: Feb. 11, 2003

(65) Prior Publication Data
US 2003/0202710 A1 Oct. 30, 2003

Related U.S. Application Data

(60) Provisional application No. 60/375,604, filed on Apr. 25, 2002.

(51) Int. Cl.
*G06K 9/36* (2006.01)

(52) U.S. Cl. .................................. 382/246; 382/232

(58) Field of Classification Search ............. 382/232, 382/239, 240, 242, 246; 341/65, 67, 106, 341/107, 51, 118, 240, 79, 87; 375/240
See application file for complete search history.

(56) References Cited

U.S. PATENT DOCUMENTS

| | | | | |
|---|---|---|---|---|
| 4,906,991 A | * | 3/1990 | Fiala et al. | 341/51 |
| 5,058,144 A | * | 10/1991 | Fiala et al. | 375/240 |
| 5,404,138 A | * | 4/1995 | Kim et al. | 341/67 |
| 5,459,482 A | * | 10/1995 | Orlen | 345/98 |
| 6,140,945 A | * | 10/2000 | Yokose | 341/65 |
| 6,681,052 B1 | * | 1/2004 | Luna et al. | 382/250 |

FOREIGN PATENT DOCUMENTS

| | | | | |
|---|---|---|---|---|
| JP | 406232765 A | * | 8/1994 | |
| JP | 410063299 A | * | 3/1998 | |

OTHER PUBLICATIONS

Titchener, "The Synchronization of Variable Length Codes", IEEE Transactions on Information Theory, vol. 43, No. 2, 3-1997, pp. 683-691.*

\* cited by examiner

*Primary Examiner*—Anh Hong Do
(74) *Attorney, Agent, or Firm*—Robert D. Marshall, Jr.; W. James Brady; Frederick J. Telecky, Jr.

(57) ABSTRACT

A method of variable length coding classifies each received symbol into one of a plurality of classifications having a corresponding variable length code table selected based upon a probability distribution of received symbols within the classification. The variable length codeword output corresponds to the received symbol according to the variable length code table corresponding to the classification of that received symbol. The plurality of classifications and the corresponding variable length code tables may be predetermined and fixed. Alternatively, the variable length code table may be dynamically determined with data transmitted from encoder to decoder specifying the variable length code tables and their configurations. Universal variable length code (UVLC) is used to code the symbols. Universal variable length code can instantiate to different variable length code tables with different parameters.

3 Claims, 2 Drawing Sheets

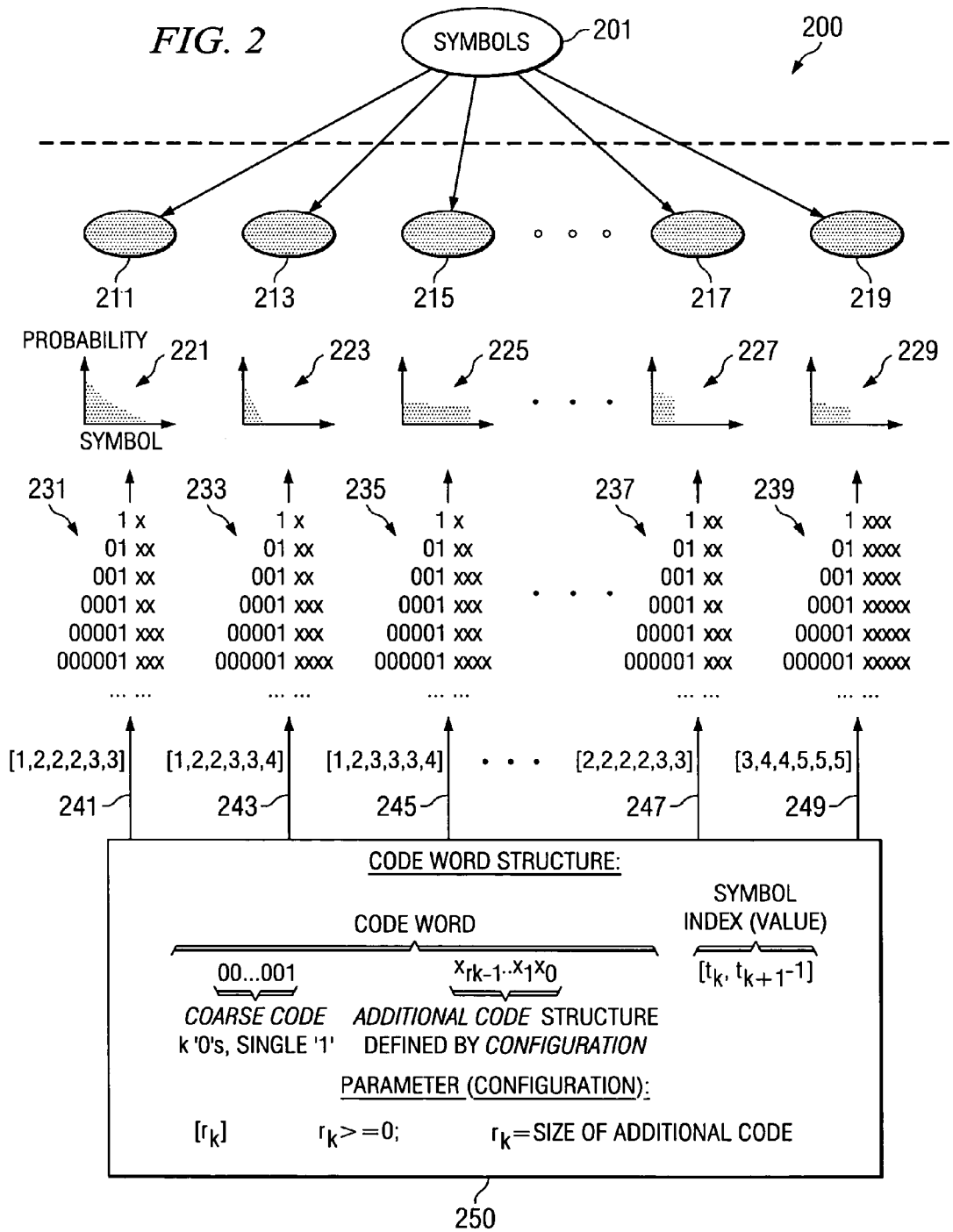

ENTROPY CODING SCHEME FOR VIDEO CODING

CLAIM OF PRIORITY

This application claim priority under 35 U.S.C. 119(e) (1) from U.S. Provisional Application No. 60/375,604 filed Apr. 25, 2002.

TECHNICAL FIELD OF THE INVENTION

The technical field of this invention is entropy coding typically used in coding compressed video.

BACKGROUND OF THE INVENTION

This disclosure proposes a scheme to improve the efficiency of entropy coding of syntax element, such as transform coefficients and motion vector difference, in video compression. Entropy coding assigns symbols to code words based on the occurrence frequency of the symbols. Symbols that occur more frequently are assigned short code words while those that occur less frequently are assigned long code words. Compression is achieved by the fact that overall the more frequent shorter code words dominate.

SUMMARY OF THE INVENTION

This invention is method of variable length coding received symbols. Each received symbol is classified into one of a plurality of classifications. Each classification has a corresponding variable length code table selected based upon a probability distribution of received symbols within the classification. The variable length codeword output corresponds to the received symbol according to the variable length code table corresponding to the classification of that received symbol. The classification can be on the basis of quantization step divided by 4 by right shifting 2 bits. This invention uses a parametric universal variable length code (UVLC) to code the symbols. Universal variable length code can instantiate to different variable length code tables with different parameters. Thus the codec needs to store only the parameters. This requires negligible memory overhead.

Each variable length codeword includes a prefix and a suffix. The prefix has at least one bit beginning with zero or more 0's and ending in a single 1. The suffix has a number of bits according to the prefix. This number of bits is determined by a configuration of the corresponding variable length code table. The value of the suffix corresponds to the received symbol.

Decoding the variable length codewords includes detecting the prefix and parsing the suffix from the detected prefix. The symbol is recovered based upon the suffix data and the corresponding variable length code table.

The plurality of classifications and the corresponding variable length code tables are predetermined and fixed in one embodiment of the invention. Alternatively, the variable length code table is determined dynamically based upon a measured probability distribution of symbols within each classification. The encoder transmits data to the decoder specifying the variable length code tables and their configurations.

BRIEF DESCRIPTION OF THE DRAWINGS

These and other aspects of this invention are illustrated in the drawings, in which:

FIG. 2 illustrates the coding process of this invention schematically.

DETAILED DESCRIPTION OF PREFERRED EMBODIMENTS

Figure 1:
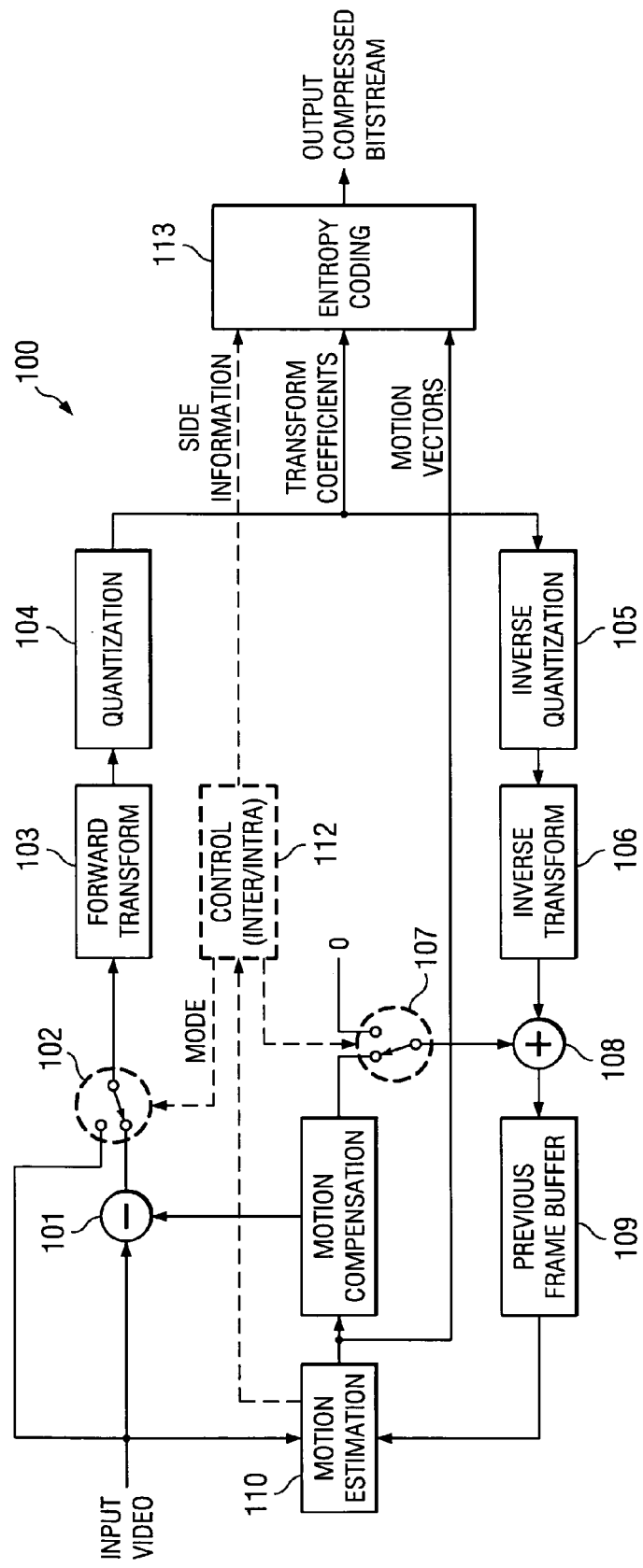
FIG. 1 is a block diagram of a video encoding system of the prior art.

FIG. 1 is a block diagram of a video encoding system 100 of the type to which this invention is applicable. Input video is supplied to motion compensation summer 101 and hence to mode switch 102. Mode switch 102 switches between an inter coding mode and an intra coding mode under the control of mode control unit 112. In the inter mode, mode switch 102 selects data from motion compensation summer 101. In the intra mode, mode switch 102 selects the data directly from the input video. Mode switch 102 feeds the selected data to forward transform unit 103. Individual macroblocks of image data are transformed into the frequency domain via a Discrete Cosine Transform (DCT). Transformed data is supplied to quantization unit 104. The quantized data in the form of transform coefficients is supplied to entropy coding block 113. Entropy coding block 113 provides variable length coding for data compression and outputs a compressed bitstream corresponding to the original input video.

This is all the processing needed for an intra frame. However, according to many video coding standards additional data compression can be achieved by utilizing redundancy between video frames. Inverse quantization block 105 reverses the quantization coding of quantization block 104. Inverse transform block 105 reverses the data transformation of forward transform block 103, such as by performing an inverse DOT. This results in substantial recovery of the original input video. If mode control unit 112 selects the inter mode, switch 107 supplies motion compensation information to adder 108. Adder 108 adds this motion compensation information to the reconstructed image data. The sum is stored in previous frame buffer 109. If mode control unit 112 selects the intra mode, them zero data is supplied to adder 108. In this case only the reconstructed frame data is stored in previous frame buffer 109. Motion estimation block 110 receives the input video and previous frame data from previous frame buffer 109. Motion estimation block 110 supplies motion vectors to motion compensation block 111 and to entropy coding block 113. Motion compensation block 111 supplies data to be subtracted from the input video via motion compensation summer 101.

Table 1 shows some of the workings of entropy coding block 113. Received symbols representative of the input video are differently coded depending upon their frequency of use. Table 1 shows 13 categories of symbols 0 to 12 arranged in order of decreasing frequency. Shorter code words are assigned to more frequently used symbols.

TABLE 1

| Symbol | Code Word Variable Length Code |
|---|---|
| 0 | 11 |
| 1 | 10 |
| 2 | 01 |
| 3 | 001 |
| 4 | 0001 |
| 5 | 0000 1 |
| 6 | 0000 01 |
| 7 | 0000 001 |

TABLE 1-continued

| Symbol | Code Word Variable Length Code |
|---|---|
| 8 | 0000 0001 |
| 9 | 0000 0000 1 |
| 10 | 0000 0000 01 |
| 11 | 0000 0000 001 |
| 12 | 0000 0000 0001 |

Data compensation results from the fact that shorter code words dominate the data transmission due to their greater frequency.

Table 2 shows an example coding technique employed in MPEG-4. Symbols are classified into two categories, intra symbols and inter symbols.

TABLE 2

| Symbol | MPEG-4 Code Words | |
|---|---|---|
| (last, run, level) | Intra | Inter |
| (0, 0, 1) | 10s | 10s |
| (1, 0, 3) | 0001 0110s | 0000 0000 101s |
| . . . | | |

This invention improves entropy coding by classifying and encoding symbols in fine granularity. Table 3 shows how this invention classifies transform coefficients. As shown in Table 2, the MPEG-4 standard classifies coefficients into two categories, inter and intra coefficients. This invention classifies the symbols into many different categories using some rules.

TABLE 3

| Symbol | Code Words | | | | |
|---|---|---|---|---|---|
| | Intra | | | | Inter |
| (last, run, level) | $0 \leq QP \leq 3$ | $4 \leq QP \leq 7$ | . . . | $28 \leq QP \leq 31$ | $0 \leq QP \leq 3$ . . . |
| (0, 0, 1) | 110s | 10s | | 1s | 10s |
| (1, 0, 3) | 00010110s | 0001111s | | 001s | 000111s |
| . . . | | | | | |

This invention may classify the intra coefficients into 16 different categories. This invention also applies different variable length code (VLC) tables to different categories. Each variable length code table takes advantage the characteristics of that category's probability distribution. The different categories should have different probability distributions. If the probability distributions are almost the same, little benefit would be achieved by separate categories. This invention achieves additional compression employing compression gain particularized to each category.

There are several proposed categories for classifying symbols. These include:

(1) Quantizer scale QP for transform coefficients. Transform coefficients are classified by the quantizer scale. For example, coefficients with QP from 0 to 3 are classified in category 0 and those with QP from 4 to 7 are classified in category 1.

(2) Picture size for transform coefficients. Transform coefficients are classified by the size of the picture. For example, coefficients of a QCIF picture are classified in category 0, coefficients of a CIF picture are assigned to category 1 and coefficients of a VGA picture are assigned to category 2.

(3) Magnitude of motion vector predictor for motion vector difference.

FIG. 2 illustrates the coding process 200 schematically. Process 200 begins with receipt of symbols 201. Process 200 sorts each symbol 201 into one of a plurality of classifications 211, 213, 215. . . 217 and 219. Each classification 211, 213, 215. . . 217 has a corresponding probability distribution of symbols within that classification of 221, 223, 225. . . 227 and 229. The received symbol 201 is coded via the variable length coding table 231, 233, 235. . . 237 and 239 corresponding to the classification 211, 213, 215. . . 217 and 219.

Each variable length coding table 231, 233, 235. . . 237 and 239 has a corresponding configuration 241, 243, 245. . . 247 and 249. The nature of each variable length code is illustrated at 250. Each variable length code has a prefix beginning with an optional number of 0's and ending with a 1. A suffix follows the prefix having a predetermined number of bits. FIG. 2 illustrates the data length form of each variable length coding of variable length coding tables 231, 233, 235. . . 237 and 239. In the example illustrated in FIG. 2, variable length coding table 231 has: 1 suffix bit for the prefix "1"; 2 suffix bits for the prefix "01"; 2 suffix bits for the prefix "001"; 2 suffix bits for the prefix "0001"; 3 suffix bits for the prefix "00001"; and 3 suffix bits for the prefix "000001". This is given in the configuration [1,2,2,2,3,3]. This format is illustrated in FIG. 2. FIG. 2 similarly illustrates that: variable length code table 233 has suffix bits according to the configuration [1,2,2,3,3,4]; variable length code table 235 has suffix bits according to the configuration [1,2,3,3,3,4]; variable length code table 237 has suffix bits according to the configuration [2,2,2,2,3,3]; and variable length code table 239 has suffix bits according to the configuration [3,4,4,5,5,5].

The coding provided by these variable length coding tables 231, 233, 235. . . 237 and 239 are illustrated in 250. The prefix begins with k number of 0's (where k is an integer greater than or equal to 0) and ends with a 1. Hence, "1", "01", "001", "0001", "00001" and "000001" are legal prefixes. The suffix $X_{rk1} \ldots x_1, x_0$ includes a number of bits $r_k$ determined by the configuration, where $r_k > 0$. The code and knowledge of the corresponding variable length coding table enables decode of each code.

Storing up to 16 different variable length code tables in encoder/decoder (codec) for each syntax element would require much memory. The preferred embodiment of this invention uses a parametric universal variable length code (UVLC) to code the symbols. Universal variable length code can instantiate to different variable length code tables with different parameters based upon the configurations. Thus the codec needs to store only the parameters. This requires negligible memory overhead. In some application only 14 bytes overhead are required for 16 different tables. The parameters may also be constrained in some way to further reduce memory overhead. Since universal variable length coding tables are structural, encoding/decoding requires only the parameters.

Table 4 shows a configurable variable length coding table according to one aspect of this invention.

TABLE 4

| Category | Prefix | Suffix | Code Number |
|---|---|---|---|
| 0 | 1 | xx | 0:3 |
| 1 | 01 | xx | 4:7 |
| 2 | 001 | xxx | 8:15 |
| 3 | 0001 | xxxx | 16:31 |
| ... | | | |

This coding of Table 4 corresponds to a configuration of [2,2,3,4].

Table 5 shows an example of configurations based upon the quantizer scale QP. The configurations are given for two types of data. The TYPE1 configuration column is used when the previous coded level was less than or equal to a threshold. The TYPE2 configuration column is used when the previous coded level was greater than the threshold.

TABLE 5

| Quantizer Scale QP | Configuration $[r_0, r_1, r_2, r_3, r_4, r_5]$ | |
|---|---|---|
| | TYPE1 | TYPE2 |
| 0–3 | [2, 2, 3, 4, 4, 5] | [3, 4, 4, 5, 5, 5] |
| 4–7 | [1, 2, 3, 3, 3, 4] | [3, 4, 4, 5, 5, 5] |
| 8–11 | [1, 2, 2, 3, 3, 4] | [3, 3, 4, 4, 5, 5] |
| 12–15 | [1, 2, 2, 3, 3, 3] | [3, 3, 4, 4, 5, 5] |
| 16–19 | [1, 2, 2, 3, 3, 3] | [3, 3, 3, 4, 5, 6] |
| 20–23 | [1, 2, 2, 2, 3, 3] | [2, 3, 3, 3, 4, 4] |
| 24–27 | [1, 2, 2, 2, 3, 3] | [2, 2, 2, 2, 3, 3] |
| 28–32 | [1, 2, 2, 2, 3, 3] | [2, 2, 2, 2, 3, 3] |

(*) $r_6 = r_5 + 1$; and in general $r_j = r_{j-1} + 1$ for $j \geq 6$

This implementation of the invention is simple. Configurations are selected based on QP/4. This can be easily implemented via QP>>2, a 2 bit right-shift operation. The configurations are static and signaled by the quantizer scale QP. Thus no additional data need be inserted into the bitstream. The configuration can be specified by the following rules:

$r_j = [1, 2, 3, 4]$ for $j = 0$
$r_j = [r_{j-1}, r_{j-1} + 1]$ for $1 \geq j \geq 5$
$r_j = r_{j-1} + 1$ for $j \geq 6$ Each configuration can be specified by only 7 bits using this method. Thus 16 configurations require only 14 bytes to specify. This is a negligible increase in the memory requirement in a video coder. The codeword numbers can be encoded using the following program code.

```
void linfo-ctable(int n,int *len, int *info, const int
    config [ ] )
{
```

```
    /* mapping n to codeword */
    int t=0;
    int i;
    for (i=0;i<N_SUF && n>=t;i++)
    {
        t+=(1<<config[i]) ;
    }
    *len=i+config[i-1];                // category i-1
    *info=n-(t-(1<<config[i])   ) ;    /* suffix */
}
```

The program code for decoding is similar. Every instance of the configuration tables can be encoded/decoded by the same program code. This amount of programming would require negligible amount of additional processing in any practical video coder.

Coding performance may be further enhanced with customized variable length coding tables. The previous discussion assumed that the plural variable length coding tables would be predetermined and known to both the encoder and the decoder. However, the encoder may consider the probability distribution data for a particular image or video frame and dynamically determine the classifications and configurations to be used. Such dynamic encoding may achieve greater data compression. The particular variable length coding tables and their configurations could be transmitted from the encoder to the decoder as a downloadable data. Similar data is downloaded to provide a custom quantization matrix in the MPEG standards.

The previously described embodiments employ this technique for intra picture symbols. This invention could also be used for inter picture symbols. This invention is also applicable to other syntax elements in the compressed data bitstream such as motion vector residue. The same considerations apply to these other syntax elements. The symbols are classified based upon probability distribution. A variable length code table configuration is selected for classification corresponding to the probability distribution. Each symbol is coded based on the corresponding variable length code table. Decoding operates in reverse.

What is claimed is:

1. A method of variable length coding received symbols comprising the steps of:

classifying each received symbol into one of a plurality of classifications;

providing for each classification a corresponding variable length code table selected based upon a probability distribution of received symbols within said classification;

generating a variable length codeword output corresponding to each received symbol from the variable length code table corresponding to the classification of the received symbol, each variable length codeword includes a prefix having at least one bit beginning with zero or more 0's and ending in a single 1, and a suffix having a number of bits determined by the prefix according to a configuration of said corresponding variable length code table and a value corresponding to said received symbol;

detecting the prefix of each variable length codeword;

parsing the suffix of each variable length codeword from the corresponding prefix; and recovering the symbol from each suffix of each variable length codeword based upon the suffix data and the corresponding variable length code table.

2. The method of variable length coding of claim 1, wherein:
   said plurality of classifications and said corresponding variable length code tables are predetermined and fixed.

3. The method of variable length coding of claim 1, wherein:
   said step of classifying each received symbol into one of a plurality of classifications includes determining a probability distribution of symbols within each classification;
   said step of providing for each classification a corresponding variable length code table forms said variable length code table dependent upon said measured probability distribution of symbols within said classification;
   said method further comprising transmitting from an encoder to a decoder data specifying each variable length code table and the corresponding configuration; and
   said step of recovering the symbol from each suffix of each variable length codeword references the transmitted data specifying said variable length code table and the corresponding configuration.

* * * * *